May 15, 1962
J. ZENZIC
3,034,611
TAPERED LOCKING DEVICE
Filed May 7, 1958
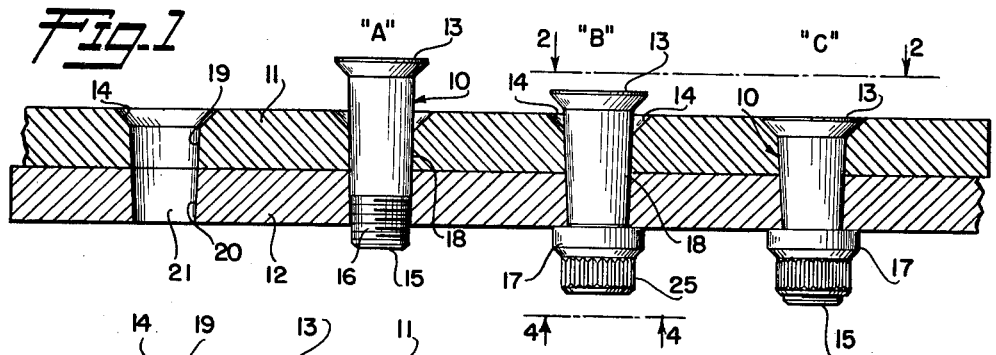
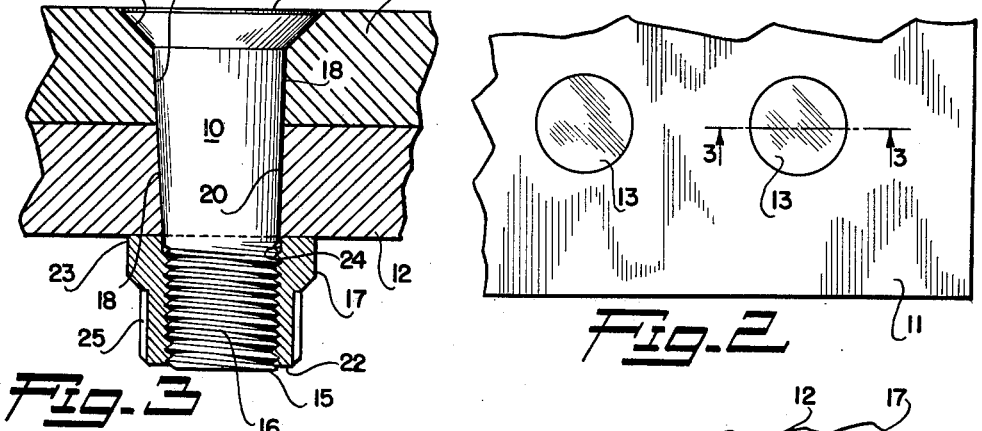
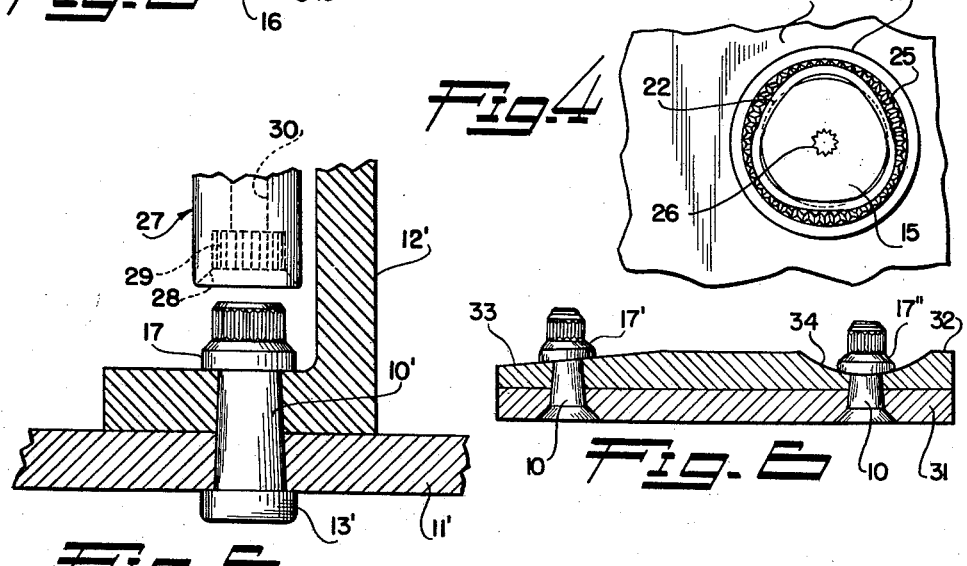
INVENTOR.
JOHN ZENZIC
BY
*R. E. Geanque*
Attorney

United States Patent Office 3,034,611
Patented May 15, 1962

3,034,611
TAPERED LOCKING DEVICE
John Zenzic, Granada Hills, Calif.
(20 Narcissa Drive, Portuguese Bend, Calif.)
Filed May 7, 1958, Ser. No. 733,517
3 Claims. (Cl. 189—36)

This invention relates to a tapered locking device and more particularly to a tapered bolt which has an interference fit with a tapered bolt hole through a joint and which is drawn into the bolt hole by a locking nut.

At present, tapered pins are utilized to prevent slipping between sheets which are to be secured together to form a joint, and in some cases, the tapered pin has a small threaded end to receive a nut which prevents the tapered pin from falling out of the tapered hole. However, since these tapered pins have no heads, the pins cannot clamp the sheets together and therefore, the pins serve only to prevent slippage between the sheets. In order to prevent separation of the sheets, it is necessary to use bolts on each side of a tapered pin which have heads thereon in order to produce a clamping force on the sheets about the tapered pin. After assembly of the tapered pin, the small nut on the end of the bolt serves simply to prevent the tapered pin from backing out.

The tapered locking bolt of the present invention serves to both clamp the sheets together and to prevent relative slipping of the sheets. In order to obtain the clamping action, the tapered locking bolt has a head which engages the surface of one sheet and a threaded end which projects through the sheets to receive a locking nut. The threads on the tapered locking bolt are as large in diameter as possible without interfering with the initial insertion of the bolt through the tapered bolt hole. The taper per inch is the same on the bolt and in the hole regardless of the diameter of the hole and of the bolt, and when the bolt is fully inserted within the hole, a slight interference exists between the bolt and the hole. Both the bolts and the nuts are constructed of high strength alloy steel, or other high strength metals and the nuts are slightly softer than the bolts to create tension rather than torsion as the nuts are tightened to pull the tapered bolt into the tapered hole. The nut is also deformed at its outer end so as to firmly grip the threads on the end of the bolt in a locking manner as the nut is tightened on the bolt. Also, the inner end of the nut has an unthreaded counterbore which can receive a small length of the threads on the bolt so that the tapered grip length on the bolt is at least the thickness of the plates forming the joint. Thus, the shank on the bolt can extend slightly beyond the joint and into the counterbore in the nut while still permitting the nut to engage one of the plates and tighten the joint. The interference lock between the bolt and the material surrounding the bolt hole provides a uniform pre-stressed condition in the material with only slight cold working, and since substantially all of the material around the hole recovers after the bolt is removed, replacement fasteners of the same type can be used again. In other words, the stress level developed in substantially all of the stressed material around the hole by insertion of the bolt does not exceed the elastic limit of the material.

It is therefore an object of the present invention to provide a locking device comprising a tapered locking bolt which is insertable into a bolt hole of the same taper per inch and which is drawn into an interference fit with the bolt hole by means of locking nut.

Another object of the invention is to provide a tapered locking bolt which is drawn into a tapered hole by a serrated drive locking nut which has a counterbore at one end so that the nut can be drawn against one surface of the joint while permitting the grip length of the bolt to be greater than the thickness of the joint.

Another object of the invention is to provide a tapered locking bolt insertable into a tapered bolt hole in a joint, said bolt having a head which is drawn against one outside surface of the joint by a nut threaded on the end of the bolt and engaging the other outside surface of the joint to provide a strong joint with no sheet slippage and good clamping action between the sheets.

These and other objects of the invention not specifically set forth above will become readily apparent from the accompanying description and drawings, in which:

FIGURE 1 is a vertical section showing two sheets or plates which are to be secured together by the present invention and showing by stages the manner in which the tapered locking device is assembled;

FIGURE 2 is a partial top plan view of the assembled sheets of FIGURE 1 taken along line 2—2 of FIGURE 1;

FIGURE 3 is a vertical section along line 3—3 of FIGURE 2 showing a tapered lock bolt fully installed;

FIGURE 4 is an end elevational view along line 4—4 of FIGURE 1 showing the deformed triangular shape of one end of the nut prior to complete threading onto the bolt;

FIGURE 5 is a sectional view of a modified joint assembly showing a protruding head on the tapered bolt for use in inside installations and illustrating the manner in which a tightening tool can be utilized in close association with the parts of the joint; and FIGURE 6 is a side elevational view showing the manner in which the nut will conform to surfaces which are tapered or concave relative to the normal nut engaging surface.

Referring to the embodiment of the invention shown in FIGURES 1 through 4, the tapered locking bolt 10 is shown in various stages for attachment of two sheets 11 and 12 along a length of these sheets. The fastening of the two sheets 11 and 12 comprises a simple installation for the tapered locking bolts, and it is understood that additional sheets or joint members could be locked together in an identical manner. The tapered bolt 10 is provided with a tapered head 13 which is received in the countersunk space 14 on sheet 11 when the bolt is fully assembled in order to provide an aerodynamically flush surface for sheet 11. The included angle on the head 13 is preferably about 100 degrees. The other end 15 of the bolt 10 comprises a straight threaded area 16 and a locking nut 17 is threaded onto end 15. The side 18 of the bolt 10 has a uniform taper per inch and it is preferred that the included taper between opposite sides of the bolt be about .020 inch per inch. This taper per inch can remain the same regardless of the length or size of the bolt. Also, the taper per inch of surfaces 19 and 20 which form the bolt hole 21 in sheets 11 and 12, respectively, is the same as the taper on the bolt. When the bolt is fully inserted within the hole 21 formed by surfaces 19 and 20 (see FIG. 3), a slight interference exists between the bolt surface 18 and the surfaces 19 and 20. This interference is preferably in the range of .001 to .0045 inch at all diameters along the length of the bolt and it is understood that the more the interference, the greater the force required to draw the bolt into the bolt hole 21 in the sheets. The serrated nut 17 can be initially threaded a short distance on the threaded area 16 without the use of a tightening tool. However, the top end portion 22 of the nut 17 is deformed into a somewhat triangular shape in order to cause locking of the threads of the nut with the threads on the threaded area 16 as further rotation of the nut takes place. This locking action results from deformation of the top portion of the nut into the circular shape of the threaded area 16 on the bolt and is made possible since the nut is heat treated to a slightly lower stress level than the bolt. It will be understood that before the top of the nut is deformed, the diameter and pitch of the threads of the nut correspond to that of the threaded area 16. Also, the base portion 23 of the nut contains a counterbore 24 in which no nut threads are located.

In FIGURE 1, the tapered bolts and locking nuts are shown in various stages of assembly with relation to the various bolt holes 21 in the sheets 11 and 12 comprising the joint. In stage A, the bolt 10 has been forced tightly into a hole 21 and it is apparent that the threaded area 16 of slightly reduced diameter extends through the hole 21 without interference with surface 20. In stage A, sufficient threads are available to engage the threads of nut 17 adjacent base portion 23 and the nut can be tightened by hand until the base portion 23 engages the surface of the sheet 12. Thereafter, any suitable torque wrench or power tool can be applied to the serrated surface 25 of the nut and the torque applied to the nut will cause the bolt 10 to be drawn through the hole 21.

In stage B of FIGURE 1, the bolt is shown partially drawn through the hole and in stage C, sufficient rotation of the nut has been accomplished to draw the head 13 of the bolt 10 into the countersink 14. With the bolt in stage C, a given amount of torque can be applied to nut 17 to obtain the desired clamping action between the sheets 11 and 12. In FIGURE 3, the bolt 10 and nut 17 are illustrated in fully assembled condition and it is apparent that the final threading of the nut will cause the deformed top end 22 of the nut to assume the circular shape of the bolt to provide a friction lock between the nut and the bolt. Also, it is apparent that the tapered grip surface 18 of the bolt 10 extends completely through the two sheets 11 and 12 and that a portion of surface 18 adjacent the threaded area 16 is located within the counterbore 24 of the nut. Thus, the bolt has no threads in bearing with the surfaces 19 and 20 forming the hole 21 and a uniform taper lock is therefore present. It is understood that the bolts 10 will be supplied in various increments of length for insertion into various thicknesses of joints and the counterbore 24 of the nut 17 permits the unthreaded surface 18 to terminate at the outer surface of the sheet 12 or to extend beyond this outer surface the distance of the counterbore of the nut while still maintaining a full taper grip length. Therefore, a single bolt length will be usable on joints having thicknesses within a particular increment, while permitting the nut 17 to be pulled up tightly against the surface of sheet 12 in order to provide a clamping action between the sheets.

In normal assembly, the bolt in stage A will be forced into the sheets sufficiently to prevent turning of the bolt as the nut 17 is tightened to draw the bolt through the hole 21. Any suitable type of torque wrench or power tool can be applied to the serrations 25 of the nut in order to tighten the nut with a torque up to a designated value, which final torque will determine the amount of clamping action between the head 13 and nut 17. Since the bolt 10 might tend to rotate during tightening of the nut in thin joints, a serrated pocket 26 is located in the end 15 of the bolt 10 in order to receive a suitable device for holding the bolt during rotation of the nut. Also, with thin plates having small engagement area between the tapered surfaces, this tendency of the bolt to rotate can in some cases be overcome by using a cleaning fluid to clean the tapered surfaces prior to insertion of the bolt and thereby increase frictional engagement. In cases where the bolts, as originally inserted in the joints, has a large engagement surface, there is less tendency of the bolt to rotate upon tightening of nut 17.

Referring to the modified joit of FIGURE 5, the bolt 10' has a protruding head 13' which bears against the surface of the sheet 11' forming one member of the joint. An angular shaped member 12' forms the other member of the joint and these members are held together by tightening the nut 17 in the manner previously described. Tool 27 is illustrative of the type of tools which can be utilized for tightening the nut 17 and this tool contains a hollow opening 28 having projections 29 which mesh with the serrations 25 in order to tighten the nut 17. Also, the tool contains a center opening 30 through which another suitable tool similar to a Phillips screwdriver can be inserted to engage the serrated pocket 26 and hold the bolt during rotation of the nut. It is understood that the tool 27 could be power driven and could incorporate a torque responsive device in order to obtain the desired clamping action between the sheets. As illustrated in FIGURE 5, the protruding head 13' can be utilized on tapered bolts of the present invention where the bolts are utilized in inside installation and aerodynamic flushness is not required. Also, it is apparent that the bolts can be located in confined spaces and closely adjacent upright portions of a joint without interfering with the assembly of the joint by suitable tools.

The bolts of the present invention are preferably fabricated of any suitable high strength alloy steel or metal which can be heat treated to between 170,000 and 190,000 p.s.i. or higher and that the nuts 17 are also fabricated of any suitable high strength alloy steel or metal which is heat treated to between 140,000 and 160,000 p.s.i. or proportionally higher. The high strength alloy steel is machined or cold headed in the annealed or normalized state before heat treatment. One such suitable steel is 4140 chrome molybdenum still listed in MIL–S–5626 of the National Aircraft Standards Committee but generally alloy steels, such as chrome-nickel-moly or chrome-vanadium, can also be utilized. When the sheets 11 and 12 are fabricated of aluminum or other softer metals, the area of the metal around the bolt is squeezed to obtain a very tight engagement with the bolt. This same squeezing action is obtained where the members of the joint are fabricated of stainless steel, although some squeezing action of the bolt itself might also take place under this condition. Because of the squeezing action of the metal, the bolt holes become fluid tight so that the joints can be utilized for liquid or gas storing compartments without leakage through the holes.

Since the nuts 17 are somewhat softer than the bolts 10, the tightening of the nuts will create tension in the bolts rather than tending to create torsion and twist the bolts, and the greater the tension applied to the bolt, the greater the clamping action on the member of the joint. Since the interference must be present before the nut can be tightened while maintaining the bolt fixed, it is impossible to assemble a bolt unless the interference actually exists. In the case where a plurality of plates are supported in a jig and become separated when the tapered hole 21 is being drilled, smaller holes result as the drill goes forward. However, these slightly smaller holes do not affect the insertion of the bolt 10 since the metal around the smaller holes is simply sprung more and makes a better seal. Also, when holes are drilled in plates held in jigs, the holes in the various members may become staggered slightly because of temperature changes, but the small threaded end of the bolt 10 can always be inserted and thereafter tightening of the bolt will cause the members of the joint to realign.

Referring to FIGURE 6, the sheets 31 and 32 are shown assembled with two tapered bolts 10. Sheet 32 has a tapered surface 33 which is engaged by nut 17' and has a concave surface 34 which is engaged by nut 17". These surfaces are at an angle to the base portion of the nut as the base portion first engages the surfaces. However, upon further tightening, the body and threads of the nuts will deform in order to permit the base portion of the nuts to conform to the surfaces. With tapered surfaces forming angles up to about seven degrees with the plane normal to the bolt, practically no deformation of the sheet material itself will result. Also, practically no sheet deformation will result when the nut on a quarter inch bolt is tightened against a concave surface of about one inch radius. In cases of larger taper or smaller radius of the engaging sheet surface, spot facing of the surface would be preferred in order to provide for even engagement of the nut surface.

By the present invention, a very strong joint is provided because the tapered interference prevents sheet slippage and good clamping action is provided between the sheets by the threaded lock nut in order to improve the joint strength and increase fatigue life. The interference between the bolt and bolt hole provides a fluid tight surface and the deformation of the nut provides a self locking feature which prevents loosening of the nut under vibration. It is understood that any suitable taper can be utilized on the bolt 10 and on the drill to form the bolt holes 21 and that in general, the taper can be greater the thinner the joint width. Also, the bolts can be made in various sizes in order to provide the required strength for various thicknesses of joints. Various modifications are contemplated by those skilled in the art without departing from the spirit and scope of the invention as hereinafter defined by the appended claims.

What is claimed is:

1. In a highly stressed structure having a plurality of overlapping members and having tapered concentric holes formed within the overlapping portion of said members, and passing therethrough, an improved fastening means which comprises: a bolt having a shank tapered substantially 0.020 inch per inch along the entire length of said shank, the diameters of the wall of said tapered shank being greater than the initial corresponding diameters of said concentric holes by 0.001 inch to 0.0045 inch, a head integrally formed on the larger end of said tapered shank, and an externally threaded section integrally formed on the smaller end of said tapered shank, the thread crest diameter of which threaded section is not greater than the diameter of said smaller end of said tapered shank, and a nut engaged with said threaded section, said bolt being inserted within said concentric holes, the head of said bolt being drawn into seating relationship with an outer surface of one of said members by the tightening of said nut, said tapered shank exerting a uniform compressive force against the walls of said concentric holes along the entire length of said holes, the degree of compression exerted against said walls being limited by the seating of the head against said outer surface of one of said members.

2. In a highly stressed structure having a plurality of overlapping members and having tapered concentric holes formed within the overlapping portion of said members, and passing therethrough, an improved fastening means which comprises: a bolt having a shank tapered over its entire length, a head integrally formed on the larger end of said tapered shank and a fastening section integrally formed on the smaller end of said tapered shank, said fastening section having no dimension which is greater than the diameter of said smaller end of said shank, and means engageable with said fastening section for placing said bolt under tension and clamping said members together between said head and said means after insertion of said shank through said holes, the diameters of the wall of said tapered shank being greater than the initial corresponding diameters of the concentric holes prior to insertion of said bolt for providing a compressive force against the walls of said concentric holes along the entire length of said holes after assembly of said bolt, the upper limit of said difference in diameters being such that the degree of compression exerted by said tapered shank on the walls of said concentric holes, when the head is seated against one of said plates, is below the elastic limit of substantially all of the stressed material of the walls thereby allowing substantial recovery of the stressed material of the walls of said concentric holes in the event of removal of said bolt from said holes, and the lower limit of the difference between the diameters of the wall of the shank and the corresponding diameters of the holes being substantially 0.001 inch.

3. In a highly stressed structure having a plurality of overlapping members and having tapered concentric holes formed within the overlapping portion of said members, and passing therethrough, an improved fastening means which comprises: a bolt having a shank tapered substantially 0.020 inch per inch along the entire length of said shank, the diameters of the wall of said tapered shank being greater than the initial corresponding diameters of said concentric holes by 0.001 inch to 0.0045 inch, a head integrally formed on the larger end of said tapered shank, and an external fastening section integrally formed on the smaller end of said tapered shank, said fastening section having no dimension which is greater than the diameter of said smaller end of said shank, and fastening means engaged with said fastening section, said bolt being inserted within said concentric holes, the head of said bolt being drawn into seating relationship with an outer surface of one of said members by said fastening means, said tapered shank exerting a uniform compressive force against the walls of said concentric holes along the entire length of said holes, the degree of compression exerted against said walls being limited by the seating of the head against said outer surface of one of said members.

References Cited in the file of this patent
UNITED STATES PATENTS

| | | |
|---|---|---|
| 1,359,587 | Flannery | Nov. 23, 1920 |
| 1,971,200 | Proctor et al. | Aug. 21, 1934 |
| 2,519,417 | Tripp | Aug. 22, 1950 |
| 2,679,879 | Engstrom | June 1, 1954 |
| 2,788,829 | Edwards | Apr. 16, 1957 |
| 2,801,061 | Logan | July 30, 1957 |
| 2,814,059 | Lehning | Nov. 26, 1957 |

FOREIGN PATENTS

| | | |
|---|---|---|
| 483,722 | Great Britain | 1938 |

OTHER REFERENCES

E. F. Bruhn: Analysis and Design of Airplane Structures, published January 1949, page 10 of chapter C4 (C4.10).